United States Patent
Rydkin et al.

(10) Patent No.: US 11,135,893 B2
(45) Date of Patent: Oct. 5, 2021

(54) TRANSPORT REFRIGERATION UNIT (TRU) DIRECT CURRENT (DC) ARCHITECTURE

(71) Applicant: CARRIER CORPORATION, Jupiter, FL (US)

(72) Inventors: Ivan Rydkin, Rochester, NY (US); Ciara Nichole Poolman, Syracuse, NY (US); Robert A. Chopko, Baldwinsville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 112 days.

(21) Appl. No.: 16/476,490

(22) PCT Filed: Jan. 19, 2018

(86) PCT No.: PCT/US2018/014425
§ 371 (c)(1),
(2) Date: Jul. 8, 2019

(87) PCT Pub. No.: WO2018/136738
PCT Pub. Date: Jul. 26, 2018

(65) Prior Publication Data
US 2020/0055366 A1    Feb. 20, 2020

Related U.S. Application Data

(60) Provisional application No. 62/448,511, filed on Jan. 20, 2017.

(51) Int. Cl.
*B60H 1/00* (2006.01)
*B60H 1/32* (2006.01)

(52) U.S. Cl.
CPC ..... *B60H 1/00428* (2013.01); *B60H 1/00364* (2013.01); *B60H 1/3208* (2013.01); *B60H 1/3228* (2019.05); *B60H 1/3232* (2013.01)

(58) Field of Classification Search
CPC ............ B60H 1/00364; B60H 1/00428; B60H 1/3208; B60H 1/3228; B60H 1/3232
See application file for complete search history.

(56) References Cited

U.S. PATENT DOCUMENTS

| | | | |
|---|---|---|---|
| 6,622,505 B2 | 9/2003 | Anderson et al. | |
| 8,260,494 B2 | 9/2012 | Yang et al. | |
| (Continued) | | | |

FOREIGN PATENT DOCUMENTS

| | | |
|---|---|---|
| EP | 2966383 A1 | 1/2016 |
| EP | 3028890 A1 | 6/2016 |
| (Continued) | | |

OTHER PUBLICATIONS

ISR/WO, Issued Jul. 10, 2018, PCT Application No. PCT/US2018/014425, 14 pages total.

*Primary Examiner* — Henry T Crenshaw
(74) *Attorney, Agent, or Firm* — Cantor Colburn LLP

(57) ABSTRACT

A transport refrigeration unit (TRU) direct current (DC) architecture includes a communications bus (41), a DC power bus (42), first and second voltage control units (VCUs 43,44) respectively comprising a DC/DC converter (430) coupled to the DC power bus and a local controller (431, 441) coupled to the communications bus and to the DC/DC converter, an energy storage unit (45) and a DC powered load. The energy storage unit is configured to provide to the DC power bus (42) a quantity of DC power via the DC/DC converter (430) of the first VCU in accordance with control exerted thereon by the local controller (431) of the first VCU and a DC powered load. The DC powered load is configured to receive from the DC power bus a quantity of DC power via the DC/DC converter of the second VCU in accordance with control exerted thereon by the local controller of the second VCU.

19 Claims, 5 Drawing Sheets

(56) References Cited

U.S. PATENT DOCUMENTS

| | | | |
|---|---|---|---|
| 8,295,950 | B1 | 10/2012 | Wordsworth et al. |
| 2002/0070712 | A1* | 6/2002 | Arul .................. H02J 7/32 320/167 |
| 2008/0087029 | A1* | 4/2008 | Renken ................ B60H 1/3226 62/134 |
| 2009/0289502 | A1* | 11/2009 | Batarseh ................ H02J 1/102 307/44 |
| 2009/0314019 | A1 | 12/2009 | Fujimoto et al. |
| 2010/0045105 | A1* | 2/2010 | Bovio ................ B60H 1/00428 307/9.1 |
| 2010/0176594 | A1 | 7/2010 | McGuire |
| 2011/0000244 | A1 | 1/2011 | Reason et al. |
| 2011/0030399 | A1 | 2/2011 | Lifson et al. |
| 2013/0118196 | A1* | 5/2013 | Chen ................ B60H 1/00428 62/134 |
| 2013/0342142 | A1* | 12/2013 | Marcinkiewicz .. B60H 1/00428 318/400.11 |
| 2014/0020414 | A1 | 1/2014 | Rusignuolo et al. |
| 2014/0026599 | A1 | 1/2014 | Rusignuolo et al. |
| 2014/0060097 | A1 | 3/2014 | Perreault |
| 2015/0121923 | A1 | 5/2015 | Rusignuolo et al. |
| 2015/0246593 | A1 | 9/2015 | Larson et al. |
| 2017/0232817 | A1* | 8/2017 | Hutchison ............ B60H 1/3232 165/42 |
| 2018/0152044 | A1* | 5/2018 | Srnec ................ B60H 1/00428 |

FOREIGN PATENT DOCUMENTS

| | | |
|---|---|---|
| WO | 2008094148 A1 | 8/2008 |
| WO | 2009142698 A1 | 11/2009 |
| WO | 2016153841 A1 | 9/2016 |

\* cited by examiner

TRANSPORT REFRIGERATION UNIT (TRU) DIRECT CURRENT (DC) ARCHITECTURE

BACKGROUND

The following description relates to a transport refrigeration unit (TRU) and, more particularly, to a TRU system with a direct current (DC) architecture.

There are various types of dedicated refrigerant systems, such as refrigeration air conditioning systems used in mobile or tray applications or truck/trailer refrigerated compartments or containers, which maintain required temperature conditions in the confines of a given storage space of a vehicle or container. Such systems can include a diesel engine that is connected by a belt, a clutch, gears or the like to a compressor and to evaporator and condenser (or gas cooler) fans. Alternatively, a diesel engine may be connected to a generator/alternator which, in turn, provides electrical power to compressors and fans. Refrigeration units can also be adapted to be plugged into an electrical power source to thereby provide electrical power to compressors and fans of the refrigeration system.

In any case, integration of battery technology, solar panels, fuel cells and other DC sources into transport refrigeration unit (TRU) power systems can create significant inefficiencies. These inefficiencies arise from, among other issues, direct current (DC) to alternating current (AC) power conversions that can be needed to drive operations of compressors or evaporator and condenser fans.

BRIEF DESCRIPTION

According to one aspect of the disclosure, a transport refrigeration unit (TRU) direct current (DC) architecture is provided. The TRU DC architecture includes a communications bus, a DC power bus, first and second voltage control units (VCUs) respectively comprising a DC/DC converter coupled to the DC power bus and a local controller coupled to the communications bus and to the DC/DC converter, an energy storage unit and a DC powered load. The energy storage unit is configured to provide to the DC power bus a quantity of DC power via the DC/DC converter of the first VCU in accordance with control exerted thereon by the local controller of the first VCU and a DC powered load. The DC powered load is configured to receive from the DC power bus a quantity of DC power via the DC/DC converter of the second VCU in accordance with control exerted thereon by the local controller of the second VCU.

In accordance with additional or alternative embodiments, the DC power bus carries 36-48 VDC and up to 600 VDC or more.

In accordance with additional or alternative embodiments, the energy storage unit includes a battery bank and the DC powered load includes a DC powered compressor.

In accordance with additional or alternative embodiments, a DC power generator is coupled to the DC power bus and is controllable by a generator controller coupled to the communications bus, a third VCU includes a DC/DC converter coupled to the DC power bus and a local controller coupled to the communications bus and to the DC/DC converter and a secondary DC powered load is configured to receive from the DC power bus a quantity of DC power via the DC/DC converter of the third VCU in accordance with control exerted thereon by the local controller of the third VCU.

In accordance with additional or alternative embodiments, a diode element is electrically interposed between the DC power generator and the DC power bus.

In accordance with additional or alternative embodiments, the DC power generator includes a diesel generator and the secondary DC powered load includes a fan.

In accordance with additional or alternative embodiments, a feedback loop is coupled to each local controller and a control unit is disposed in signal communication with each of the first and second VCUs via the DC power bus and is configured to control operations of each of the local controllers in accordance with data retrieved from the corresponding feedback loop.

In accordance with another aspect of the disclosure, a transport vehicle is provided. The transport vehicle includes a trailer, an engine to drive movements of the trailer and a transport refrigeration unit (TRU). The TRU is configured to cool an interior of the trailer and has a direct current (DC) architecture. The DC architecture includes a communications bus, a DC power bus, first and second voltage control units (VCUs) respectively comprising a DC/DC converter coupled to the DC power bus and a local controller coupled to the communications bus and to the DC/DC converter, an energy storage unit and a DC powered load. The energy storage unit is configured to provide to the DC power bus a quantity of DC power via the DC/DC converter of the first VCU in accordance with control exerted thereon by the local controller of the first VCU. The DC powered load is configured to receive from the DC power bus a quantity of DC power via the DC/DC converter of the second VCU in accordance with control exerted thereon by the local controller of the second VCU.

In accordance with additional or alternative embodiments, the DC power bus carries 36-48 VDC and up to 600 VDC or more.

In accordance with additional or alternative embodiments, the energy storage unit includes a battery bank and the DC powered load includes a DC powered compressor.

In accordance with additional or alternative embodiments, a DC power generator is coupled to the DC power bus and is controllable by a generator controller coupled to the communications bus, a third VCU includes a DC/DC converter coupled to the DC power bus and a local controller coupled to the communications bus and to the DC/DC converter and a secondary DC powered load is configured to receive from the DC power bus a quantity of DC power via the DC/DC converter of the third VCU in accordance with control exerted thereon by the local controller of the third VCU.

In accordance with additional or alternative embodiments, a diode element is electrically interposed between the DC power generator and the DC power bus.

In accordance with additional or alternative embodiments, the DC power generator includes a diesel generator and the secondary DC powered load includes a fan.

In accordance with additional or alternative embodiments, the DC power generator includes a diesel generator of the engine.

In accordance with additional or alternative embodiments, a feedback loop is coupled to each local controller and a control unit is disposed in signal communication with each of the first and second VCUs via the DC power bus and is configured to control operations of each of the local controllers in accordance with data retrieved from the corresponding feedback loop.

According to yet another aspect of the disclosure, a method of operating a transport refrigeration unit (TRU)

direct current (DC) architecture is provided. The method includes providing a quantity of DC power from an energy storage/generating unit to a DC power bus via a DC/DC converter of a first voltage control unit (VCU) in accordance with control exerted thereon by a local controller of the first VCU and receiving a quantity of DC power at a DC powered load from the DC power bus via a DC/DC converter of a second VCU in accordance with control exerted thereon by a local controller of the second VCU.

In accordance with additional or alternative embodiments, the DC power bus carries 36-48 VDC.

In accordance with additional or alternative embodiments, the DC power bus carries up to 600 VDC or more.

In accordance with additional or alternative embodiments, the energy storage/generating unit includes a battery bank or a diesel generator and the DC powered load includes a DC powered compressor or a fan.

In accordance with additional or alternative embodiments, the method further includes controlling operations of each of the local controllers in accordance with data retrieved from a corresponding feedback loop.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1A:
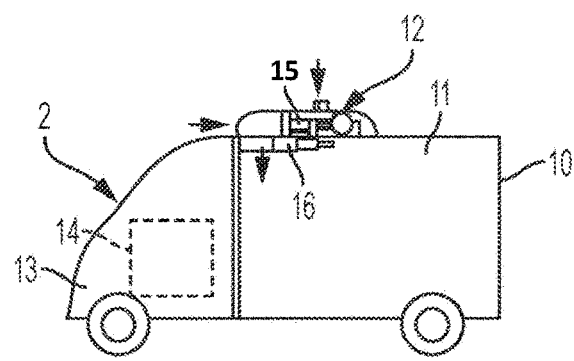
FIG. 1A is an illustration of a refrigerated vehicle in accordance with embodiments.

As will be described below, a system architecture is provided for complete operation on a direct current (DC) bus. The system architecture includes DC powered brushless or brushed fans, DC powered compressors and provides for DC power integration into a truck and/or other support equipment. The system architecture can be provided for high-voltage operations (e.g., 600 VDC+) or low voltage operations (e.g., 36V DC or 48V DC) to leverage existing refrigeration components and future power supply systems.

With reference to FIGS. 1A, 1B, 1C and 1D, exemplary refrigerated vehicles 2, 4, 6 and 8 are shown. Each refrigerated vehicle 2, 4, 6 and 8 has at least one refrigerated compartment or trailer 10 that is formed to define an interior 11, which is maintained at a desired temperature by a transport refrigeration unit (TRU) 12 during operational conditions, and a cab 13. The cab 13 houses an engine 14 that is configured to drive movements of the refrigerated vehicles 2, 4, 6 and 8 and their respective trailers 10. As will be described below with additional reference to FIGS. 2 and 3, the TRU 12 includes a first module 15 that can be mounted on the exterior of the trailer 10 and a second module 16 that can be mounted within the interior 11 of the trailer 10. The first module 15, which may be referred to as a condenser sub-assembly, includes condensing and compressing elements of the refrigeration unit. The second module 16, which may be referred to as an evaporator sub-assembly, includes an evaporator of the refrigeration unit.

Figure 1B:
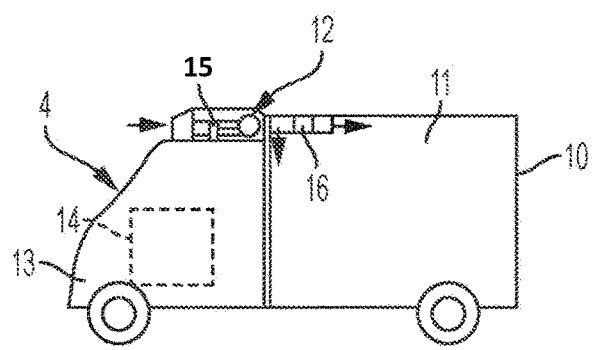
FIG. 1B is an illustration of a refrigerated vehicle in accordance with embodiments.
Figure 1C:
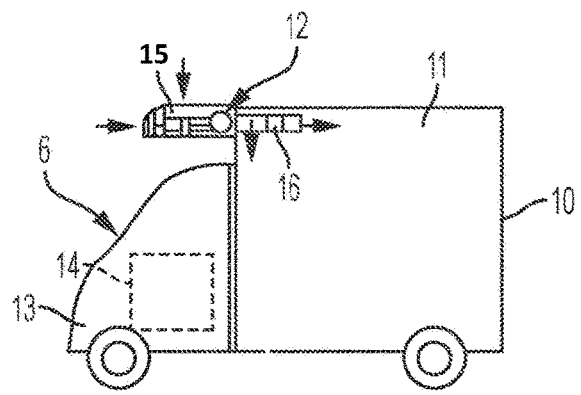
FIG. 1C is an illustration of a refrigerated vehicle in accordance with embodiments.
Figure 1D:
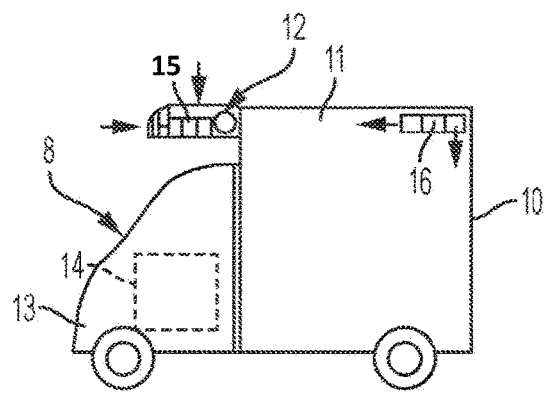
FIG. 1D is an illustration of a refrigerated vehicle in accordance with embodiments.

As shown in FIG. 1A, the refrigerated vehicle 2 has a "roof top" arrangement. Here, the first module 15 is mounted on the roof of the trailer 10 and the second module 16 is mounted to the underside of the top of the trailer 10 within the interior 11. As shown in FIG. 1B, the refrigerated vehicle 4 has a "recessed" arrangement in which the first module 15 is mounted within a recessed area provided in the roof of the cab 12 and the second module 16 is mounted adjacent to the first module 15 and to the underside of the top of the trailer 10 within the interior 11. As shown in FIG. 1C, the refrigerated vehicle 6 has a "mono-block" arrangement. Here, the first module 15 is mounted to a front wall of the trailer 10 above the cab 12 and the second module 16 is connected to the first module 15 through an insulated wall of the trailer 10 so as to effectively form a single unit. As shown in FIG. 1D, the refrigerated vehicle 8 has a "split" arrangement in which the first module 15 is mounted to the front wall of the trailer 10 and the second module 16 is mounted at the rear of the trailer 10 within the interior 11.

Figure 2:
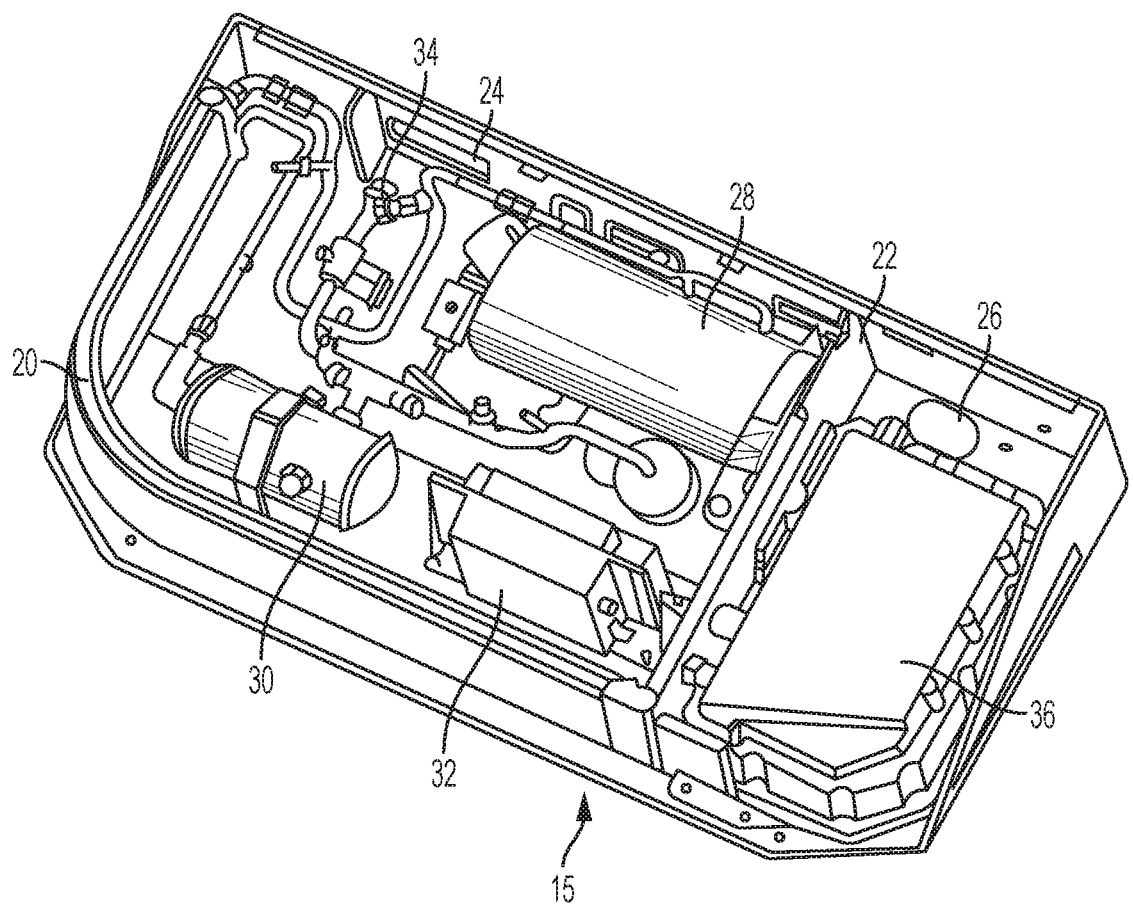
FIG. 2 is a perspective view of a first module of a transport refrigeration unit (TRU) in accordance with embodiments.

With reference to FIG. 2, the first module 15 may include an outer framework 20 that can be mounted for example to the trailer 10 and provides support for components therein. An internal panel 22, which is attached to the framework 20, and provides additional support for the components therein, divides the first module 15 into first and second compartments 24 and 26. Within the first compartment 24 is a compressor 28, a condenser 30, a microcontroller 32 and tubing 34 for carrying refrigerant between the compressor 28, the condenser 30 and the second module 16. Within the second compartment 26 is a power converter 36 connected to one or more electrical power supplies. One or more fan assemblies or heat sinks (not shown) may also be provided in the second compartment 26 to maintain the power converter 36 at a desired temperature.

Figure 3:
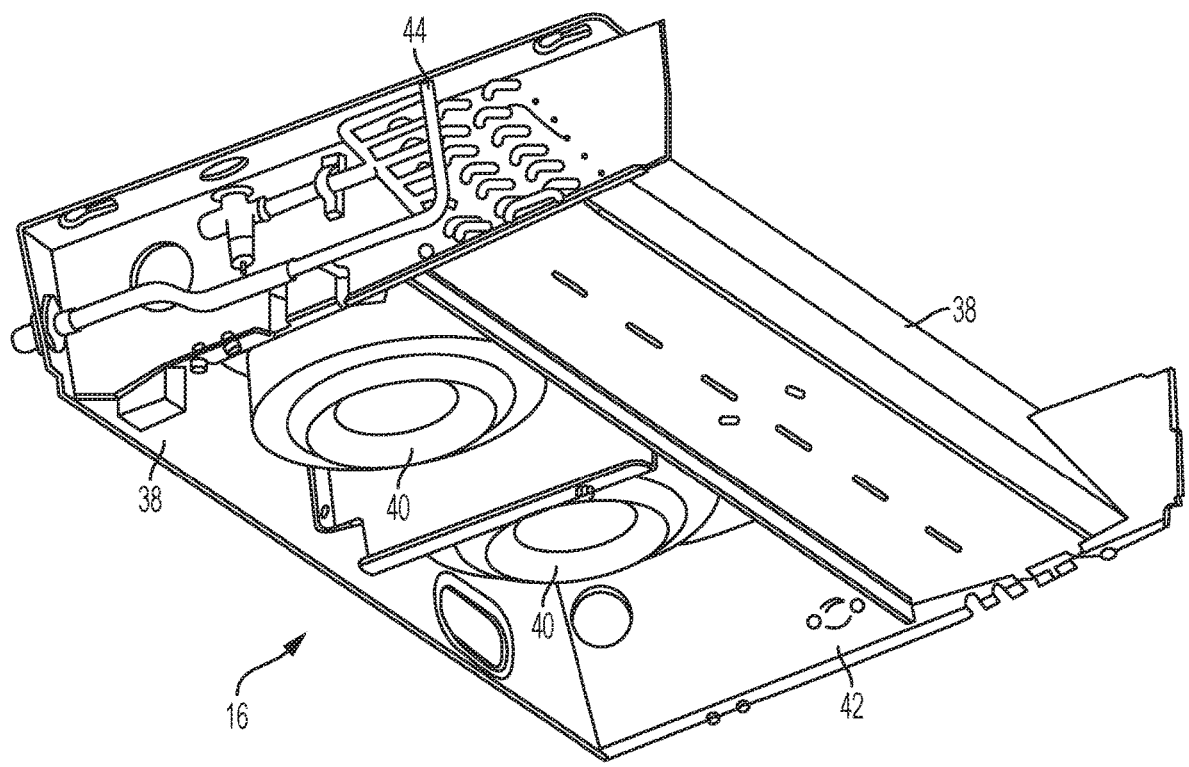
FIG. 3 is a perspective view of a second module of a transport refrigeration unit (TRU) in accordance with embodiments.

With reference to FIG. 3, the second module 16 may include an outer framework 38 that can be mounted to the interior of the trailer 10 and provides support for the components therein. The second module 16 may also include an evaporator 40 and evaporator fans 42 for providing a flow of air over the evaporator 40. Tubing 44 may also be provided for carrying refrigerant to the evaporator 40 from the tubing 34 of the first module 14.

Figure 4:
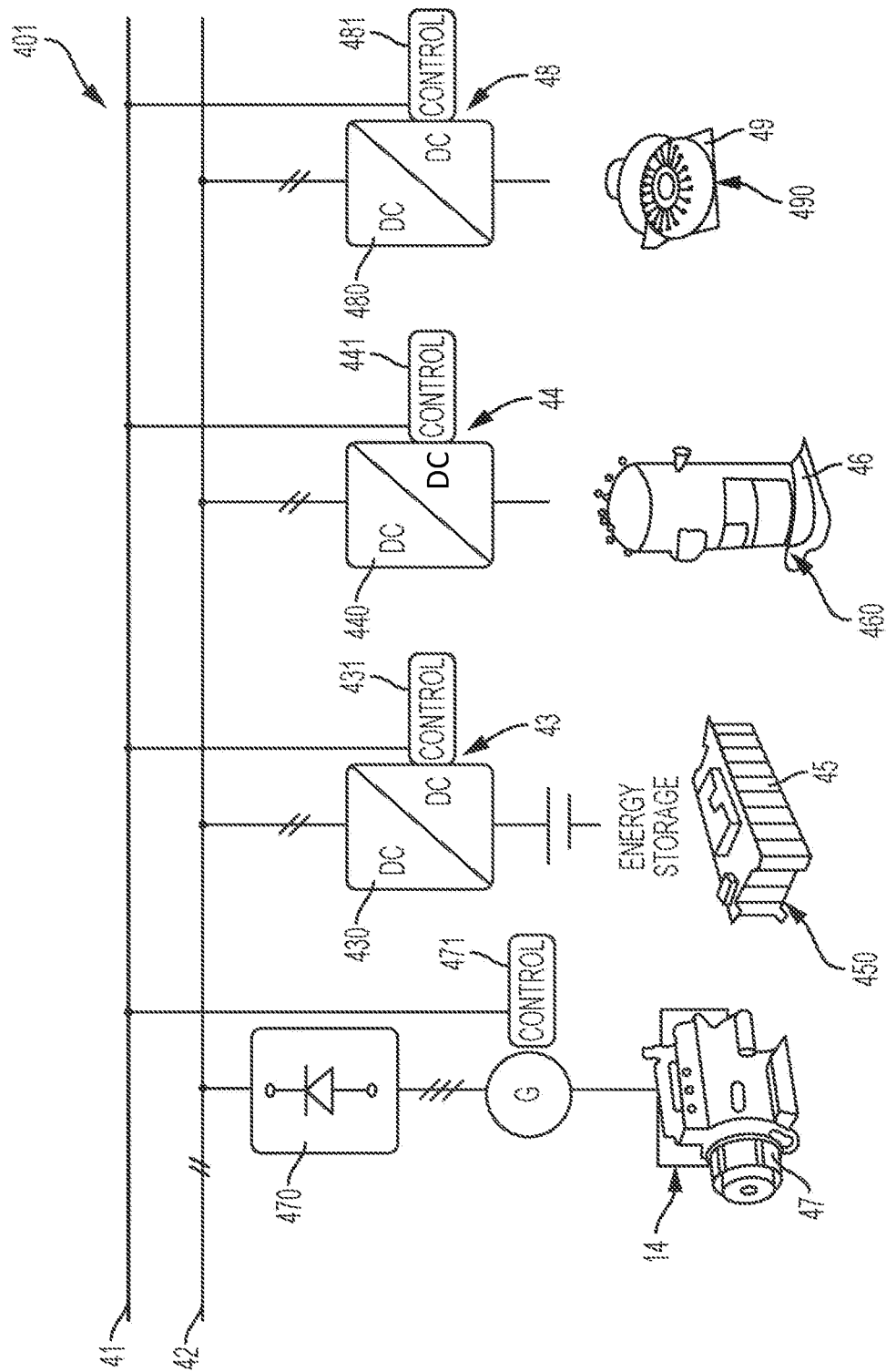
FIG. 4 is a schematic diagram illustrating a direct current (DC) architecture of a transport refrigeration unit (TRU) in accordance with embodiments.

With reference to FIG. 4, it is seen that the TRU 12 is configured to cool the interior 11 of the trailer 10. In accordance with embodiments and, as shown in FIG. 4, the TRU 12 has or is associated with a direct current (DC) architecture 401 that includes a communications bus 41, a DC power bus 42, a first voltage control unit (VCU) 43, a second VCU 44 at least one or more energy storage unit 45 and at least one or more DC powered load 46. The first VCU 43 may include a first DC/DC power converter 430, which is coupled to the DC power bus 42, and a first local controller 431. The first local controller 431 is coupled to the communications bus 41 and to the first DC/DC power converter 430. The first local controller 431 is thus disposed and configured to receive DC/DC power conversion commands from the DC communications bus 41 and to control the first DC/DC power converter 430 accordingly. The second VCU 44 may include a second DC/DC power converter 440, which is coupled to the DC power bus 42, and a second local controller 441. The second local controller 441 is coupled to the communications bus 41 and to the second DC/DC power converter 430. The second local controller 441 is thus disposed and configured to receive DC/DC power conversion commands from the DC communications bus 41 and to control the second DC/DC power converter 440 accordingly.

The energy storage unit 45 is configured to provide to the DC power bus 42 a quantity of DC power via the first DC/DC power converter 430 of the first VCU 43 in accordance with the control exerted on the first DC/DC power converter 430 by the first local controller 431 of the first VCU 43. The DC powered load 46 is configured to receive from the DC power bus 42 a quantity of DC power via the second DC/DC power converter 440 of the second VCU 44 in accordance with the control exerted on the second DC/DC power converter 440 by the second local controller 441 of the second VCU 44.

In accordance with embodiments, the DC power bus 42 can be provided to operate in high or low voltage modes and can carry 36-48 VDC and/or up to 600 VDC or more. In accordance with further embodiments, the energy storage unit 45 may include or be provided as a battery bank 450 with the DC powered load 46 including or being provided as a DC powered compressor 460. In the latter case, the DC powered compressor 460 may be the compressor 28 of the first module 15 (see FIG. 2).

In accordance with further embodiments and, as shown in FIG. 4, the TRU 12 may also include a DC power generator 47, a third VCU 48 and a secondary DC powered load 49. In such cases, the DC power generator 47 would be coupled to the DC power bus 42 via a diode element 470, for example, and would be controllable by a generator controller 471, which is coupled to the communications bus 41. The generator controller 471 is thus disposed and configured to receive DC power generation commands from the DC communications bus 41 and to control the DC power generator 47 accordingly. The third VCU 48 may include a third DC/DC power converter 480, which is coupled to the DC power bus 42, and a third local controller 481. The third local controller 481 is coupled to the communications bus 41 and to the third DC/DC power converter 480. The third local controller 481 is thus disposed and configured to receive DC/DC power conversion commands from the DC communications bus 41 and to control the third DC/DC power converter 480 accordingly. The secondary DC powered load 49 is configured to receive from the DC power bus 42 a quantity of DC power via the third DC/DC converter 480 of the third VCU 48 in accordance with the control exerted on the third DC/DC power converter 480 by the third local controller 481 of the third VCU 48.

In accordance with embodiments, the DC power generator 47 may be provided as a diesel generator or, in some cases, as the engine 14 of the refrigerated vehicle 2, 4, 6 and 8 (see FIG. 1). The secondary DC powered load 49 may include or be provided as a brushless or brushed fan 490 of the one or more fan assemblies of the first module 15 or as an evaporator fan 42 of the second module 16 (see FIGS. 2 and 3).

Figure 5:
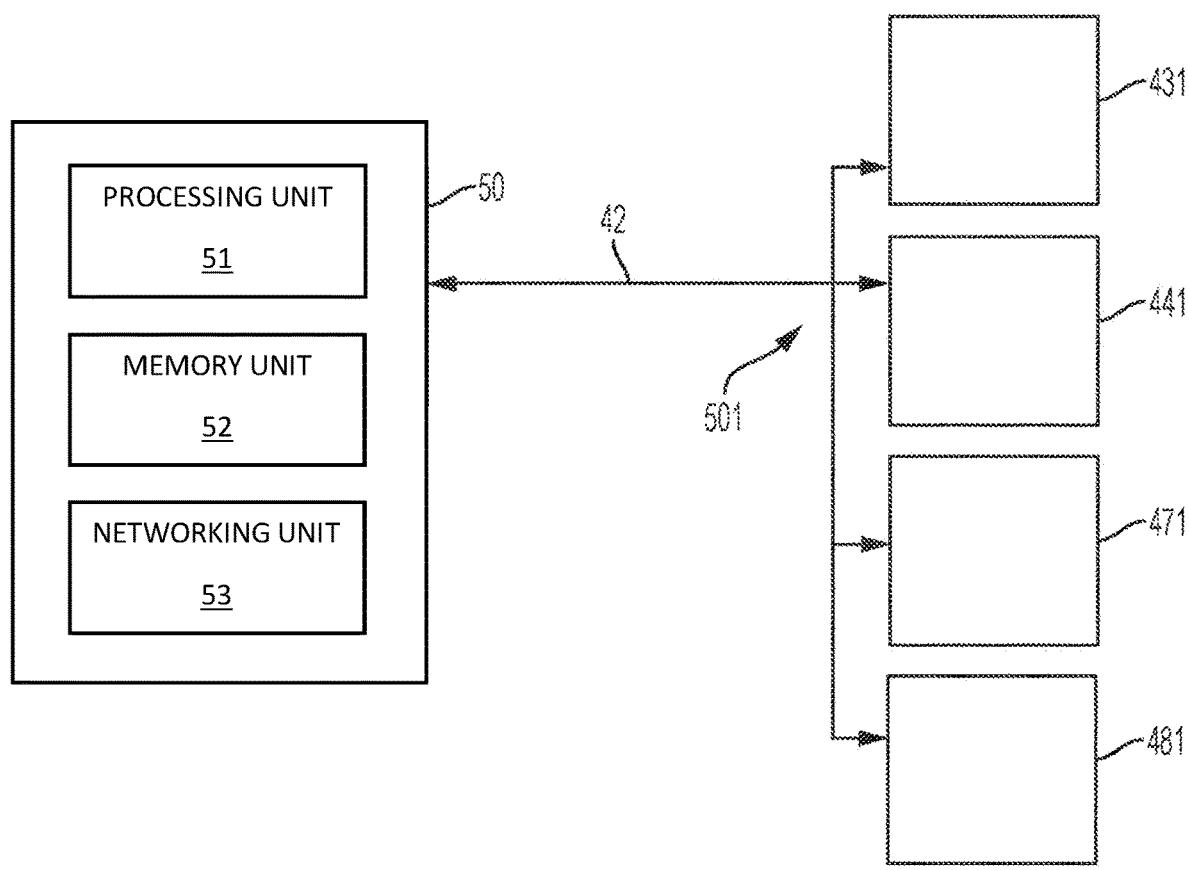
FIG. 5 is a schematic diagram illustrating a feedback loop of a direct current (DC) architecture of a transport refrigeration unit (TRU) in accordance with embodiments.

With reference to FIG. 5, the TRU 12 may also include a control element 50. As shown in FIG. 5, the control element 50 may be coupled to any one or all of the first local controller 431, the second local controller 441, the generator controller 471 and the third local controller 481 via the communications bus 41 and may be receptive or in possession of target DC/DC power conversion and generation data for each of the first, second and third VCUs 43, 44 and 48 and for the DC power generator 47 as well as actual DC/DC power conversion and generation data. With such a feedback loop configuration 501, the control element 50 may be configured to issue DC/DC power conversion commands to each of the first local controller 431, the second local controller 441, the generator controller 471 and the third local controller 481 and to issue DC power generation commands to the generator controller 471 based on differences between the target DC/DC power conversion and generation data and the actual DC/DC power conversion and generation data.

In accordance with embodiments, the control element 50 may include a processing unit 51, a memory unit 52 and a networking unit 53 coupled to the communications bus 41. The memory unit 52 has executable instructions stored thereon, which, when executed cause the processing unit 51 to be receptive of the actual DC/DC power conversion and generation data, to determine the differences between the actual DC/DC power conversion and generation data and the target DC/DC power conversion and generation data and to issue the DC/DC power conversion and generation commands in accordance with the differences.

With the configurations described above, a DC to alternating current (AC) conversion step can be removed from, for example, the battery bank 450 to the compressor and the fans. This can lead to a ~3-~8% energy consumption reduction among other advantages. In addition, by removing a DC to AC conversion step, cost and weight penalties associated with having to include conversion equipment in the TRU 12 are avoided or removed.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A transport refrigeration unit (TRU) direct current (DC) architecture, comprising:
   a communications bus;
   a DC power bus;
   first and second voltage control units (VCUs) respectively comprising a DC/DC converter coupled to the DC power bus and a local controller coupled to the communications bus and to the DC/DC converter;
   an energy storage unit configured to provide to the DC power bus a quantity of DC power via the DC/DC converter of the first VCU in accordance with control exerted thereon by the local controller of the first VCU; and a DC powered load configured to receive from the DC power bus a quantity of DC power via the DC/DC converter of the second VCU in accordance with control exerted thereon by the local controller of the second VCU.

2. The TRU according to claim 1, wherein the DC power bus carries 36-48 VDC and up to 600 VDC or more.

3. The TRU according to claim 1, wherein the energy storage unit comprises a battery bank and the DC powered load comprises a DC powered compressor.

4. The TRU according to claim 1, further comprising:
a DC power generator coupled to the DC power bus and controllable by a generator controller coupled to the communications bus;
a third VCU comprising a DC/DC converter coupled to the DC power bus and a local controller coupled to the communications bus and to the DC/DC converter; and
a secondary DC powered load configured to receive from the DC power bus a quantity of DC power via the DC/DC converter of the third VCU in accordance with control exerted thereon by the local controller of the third VCU.

5. The TRU according to claim 4, further comprising a diode element electrically interposed between the DC power generator and the DC power bus.

6. The TRU according to claim 4, wherein the DC power generator comprises a diesel generator and the secondary DC powered load comprises a fan.

7. The TRU according to claim 4, further comprising:
a feedback loop coupled to each local controller and the generator controller; and
a controller disposed in signal communication with each of the first, second and third VCUs and the generator controller via the DC power bus and configured to control operations of each of the local controllers of each of the first, second and third VCUs and the generator controller in accordance with data retrieved from the corresponding feedback loop,
wherein the controller is configured to issue DC/DC power conversion commands to each of the local controllers of each of the first, second and third VCUs and the generator controller and to issue DC power generation commands to the generator controller based on differences between target DC/DC power conversion and generation data and actual DC/DC power conversion and generation data.

8. A transport vehicle, comprising:
a trailer;
an engine to drive movements of the trailer; and
a transport refrigeration unit (TRU) configured to cool an interior of the trailer, the TRU having a direct current (DC) architecture, comprising:
a communications bus;
a DC power bus;
first and second voltage control units (VCUs) respectively comprising a DC/DC converter coupled to the DC power bus and a local controller coupled to the communications bus and to the DC/DC converter;
an energy storage unit configured to provide to the DC power bus a quantity of DC power via the DC/DC converter of the first VCU in accordance with control exerted thereon by the local controller of the first VCU; and
a DC powered load configured to receive from the DC power bus a quantity of DC power via the DC/DC converter of the second VCU in accordance with control exerted thereon by the local controller of the second VCU.

9. The TRU according to claim 8, wherein the DC power bus carries 36-48 VDC and up to 600 VDC or more.

10. The TRU according to claim 8, wherein the energy storage unit comprises a battery bank and the DC powered load comprises a DC powered compressor.

11. The TRU according to claim 8, further comprising:
a DC power generator coupled to the DC power bus and controllable by a generator controller coupled to the communications bus;
a third VCU comprising a DC/DC converter coupled to the DC power bus and a local controller coupled to the communications bus and to the DC/DC converter; and
a secondary DC powered load configured to receive from the DC power bus a quantity of DC power via the DC/DC converter of the third VCU in accordance with control exerted thereon by the local controller of the third VCU.

12. The TRU according to claim 11, further comprising a diode element electrically interposed between the DC power generator and the DC power bus.

13. The TRU according to claim 11, wherein the DC power generator comprises a diesel generator and the secondary DC powered load comprises a fan.

14. The TRU according to claim 11, wherein the DC power generator comprises a diesel generator of the engine.

15. The TRU according to claim 11, further comprising:
a feedback loop coupled to each local controller and the generator controller; and
a controller disposed in signal communication with each of the first, second and third VCUs and the generator controller via the DC power bus and configured to control operations of each of the local controllers of each of the first, second and third VCUs and the generator controller in accordance with data retrieved from the corresponding feedback loop,
wherein the controller is configured to issue DC/DC power conversion commands to each of the local controllers of each of the first, second and third VCUs and the generator controller and to issue DC power generation commands to the generator controller based on differences between target DC/DC power conversion and generation data and actual DC/DC power conversion and generation data.

16. A method of operating a transport refrigeration unit (TRU) direct current (DC) architecture, the method comprising:
providing a quantity of DC power from an energy storage/generating unit to a DC power bus via a DC/DC converter of a first voltage control unit (VCU) in accordance with control exerted thereon by a local controller of the first VCU;
receiving a quantity of DC power at a DC powered load from the DC power bus via a DC/DC converter of a second VCU in accordance with control exerted thereon by a local controller of the second VCU; and
controlling operations of each of the local controllers in accordance with data retrieved from a corresponding feedback loop,
wherein the controlling comprises:
issuing DC/DC power conversion commands to each of the local controllers of the first and second VCU and a generator controller; and
issuing DC power generation commands to the generator controller based on differences between target DC/DC power conversion and generation data and actual DC/DC power conversion and generation data.

17. The method according to claim 16, wherein the DC power bus carries 36-48 VDC.

18. The method according to claim 16, wherein the DC power bus carries up to 600 VDC or more.

19. The method according to claim 16, wherein the energy storage/generating unit comprises a battery bank or a diesel generator and the DC powered load comprises a DC powered compressor or a fan.

* * * * *